Feb. 7, 1961 S. LIEBERMAN 2,970,419
TURF EDGE TRIMMER AND HEDGE CLIPPER
Filed Oct. 7, 1958 2 Sheets-Sheet 1
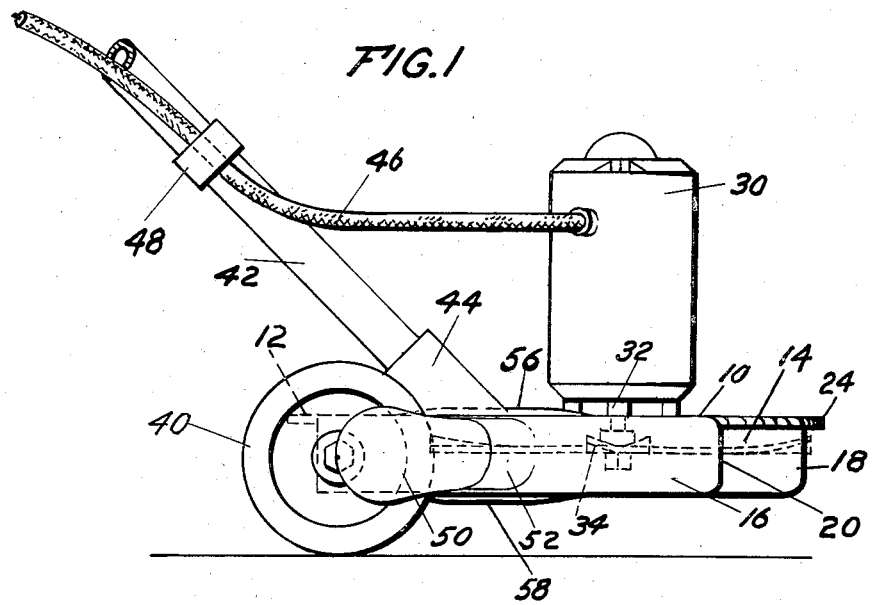
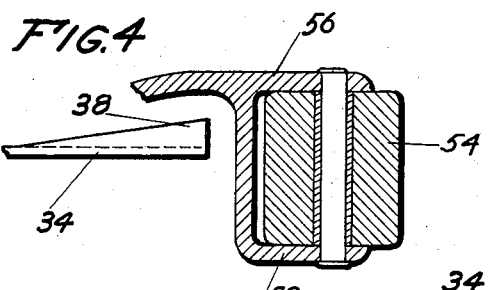
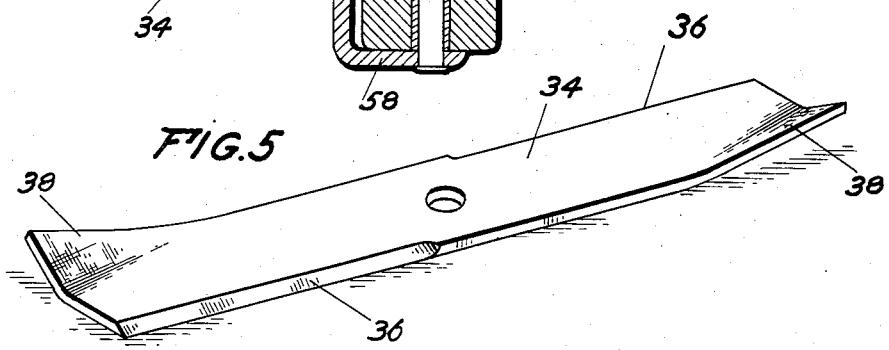
INVENTOR.
SAMUEL LIEBERMAN
BY
ATTORNEYS Feb. 7, 1961 S. LIEBERMAN 2,970,419
TURF EDGE TRIMMER AND HEDGE CLIPPER
Filed Oct. 7, 1958 2 Sheets-Sheet 2
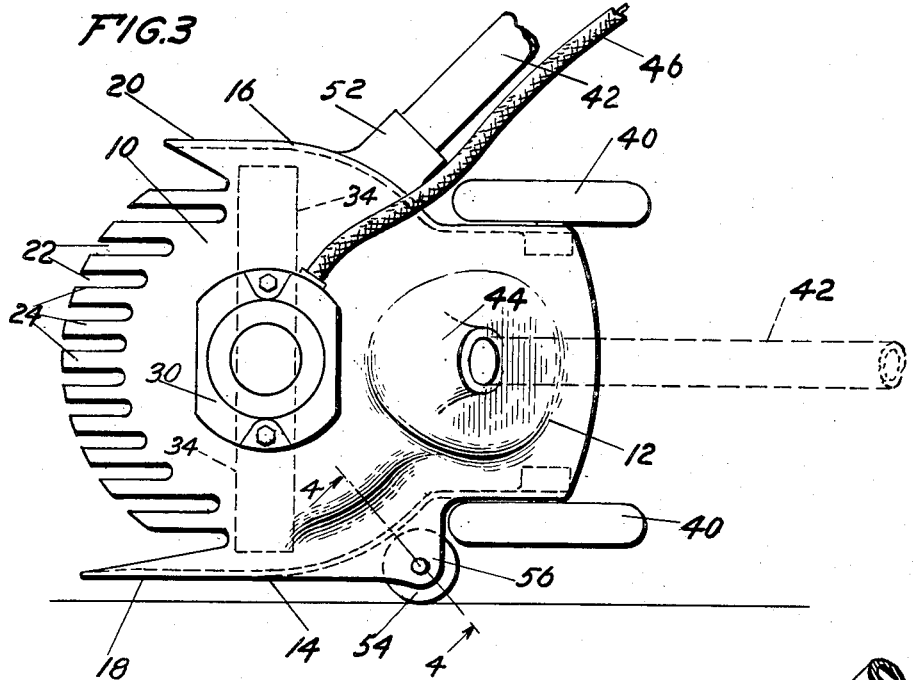
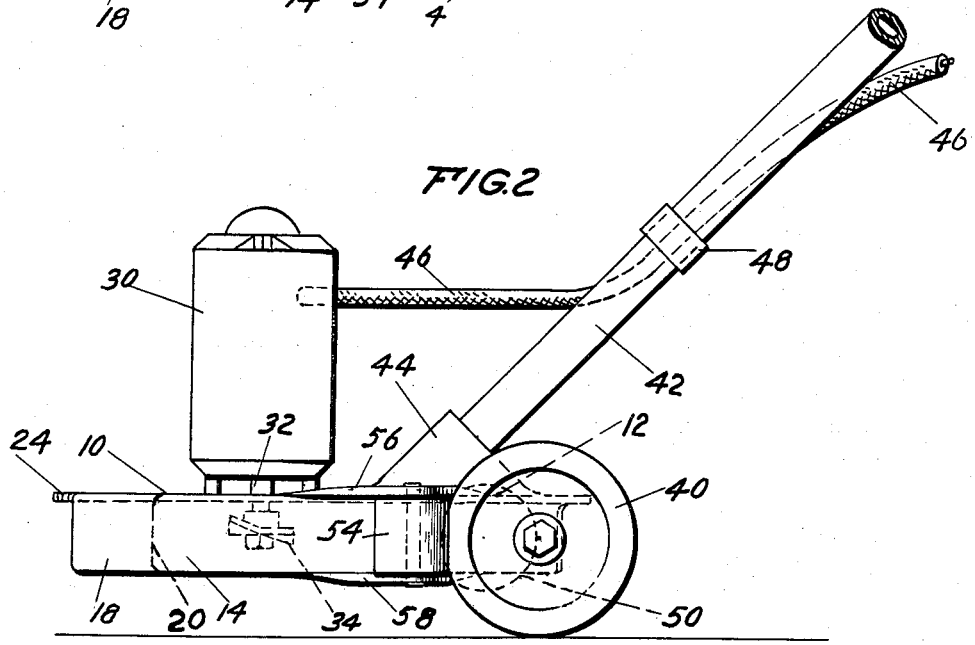
INVENTOR.
SAMUEL LIEBERMAN
BY
ATTORNEYS

# United States Patent Office 2,970,419
Patented Feb. 7, 1961

2,970,419
TURF EDGE TRIMMER AND HEDGE CLIPPER
Samuel Lieberman, 42 Oak Hill, Newton Center, Mass.
Filed Oct. 7, 1958, Ser. No. 765,822
1 Claim. (Cl. 56—25.4)

This invention relates to an improved rotary cutter for trimming the edges of lawns at walls, walks, trees and the like and for clipping hedges. It is an object of the invention to provide a cutter which is light in weight and simple in structure.

According to the invention, the cutter comprises a carriage or frame having a pair of wheels by which the cutter can be readily moved with a rotary knife which revolves about a vertical axis and is driven by a suitable motor, preferably electric. The frame also has a front guard and a forwardly projecting feeler to pick up grass overlying the margin of a walk to bring it into the path of the cutter blade.

For a more complete understanding of the invention, reference may be had to the following description of an embodiment thereof and to the drawings, of which:

Figure 1 is a side elevation of a machine embodying the invention, showing its use with the cutter shaft in the vertical position;

Figure 2 is an elevational view of the other side of the same;

Figure 3 is an elevation of the same machine in a semi-inverted position for use with its cutter axis horizontal;

Figure 4 is a fragmentary section on the line 4—4 of Figure 3, on an enlarged scale; and Figure 5 is an enlarged perspective view of the cutter blade.

The machine illustrated on the drawing comprises a frame which can conveniently be cast in a single piece of aluminum, this frame consisting of a horizontal plate 10 which is generally circular in shape as shown in Figure 3 but which also has a rearward extension 12. Along the sides of the plate 10 and its extension 12 are skirts 14 and 16 which extend downward an inch or so from the plane of the plate 10 and extension 12 when the plate is in its normal horizontal position. The skirts 14 and 16 have forwardly projecting portions 18 and 20 which are tangent to the circle of the plate 10 and are in parallel planes. The projection 18 extends further forward than does the projection 20 for a purpose hereinafter mentioned. The forward arcuate edge of the plate 10 is interrupted by a series of parallel slots or recesses 22 which extend rearwardly from the edge. These recesses define a series of forwardly projecting teeth 24, these teeth being integral with the plate 10. Mounted centrally on the plate 10 is an electric motor 30 having a shaft 32 which projects down through the center of the plate 10 and carries on its lower end a blade 34 which is attached at its mid point to the shaft 32 so as tot be perpendicular thereto and to rotate in a horizontal plane when the shaft 32 is in its normal vertical position. The leading edge 36 of the blade are the cutting edges and are sharp for that purpose, the ends of the blade having bent up portions 38 at the trailing edges to act as fan blades tending to suck the grass upward as the blade revolves. As indicated in Figure 1, the blade revolves in a plane which is above the level of the lower edges of the skirts 14 and 16. The plate 10 thus acts as a top guard for the blade while the skirts 14 and 16 act as side guards.

A pair of wheels 40 are mounted on the rearward extension 12 to rotate about a common horizontal axis when the machine is in its normal position of operation. The diameter of the wheels 40 is such as to support the blade 34 at the desired height from the surface on which the wheels rest. A suitable handle 42 is screwed into a socket 44 which is integral with the rearward extension 12. An electric cable 46 to carry current to the motor 30 is conveniently clipped as by a clip 48 to the handle 42 so as to keep the cable clear of the blade 34. The handle shaft 42 is of sufficient length to enable the operator to operate the machine conveniently when in a standing position. When the machine is used thus, it is particularly useful for cutting grass close to a wall or a tree which cannot be reached by an ordinary lawn-mower. The grass that is near the wall or tree enters the recesses 22 as the machines is advanced and is supported laterally by the teeth 24 to assist the revolving blade 34 to cut it. The grass which is actually against the wall or tree is scooped by the feeler 18 and flexed into the operating path of the blade. The machine thus quickly and easily trims the marginal grass along walls, trees and the like which usually has to be clipped by hand-clippers.

The handle shaft 42 can be readily removed from the socket 44 and replaced by a shorter handle such as that indiacted at 50 in Figure 1. An additional socket 52 is provided on the skirt 16 so that when the machine is used for trimming a hedge, a handle 50 and a similar handle in the socket 44 will provide for two-hand manipulation of the machine.

For trimming the edge of a lawn at a walk or other pavement flush with the lawn the machine can be used in a semi-inverted position such as illustrated in Figure 3. For such use, the roller 54 is mounted between a pair of ears 56 and 58 so that it projects slightly outward from the outer surface of the skirt 14, as shown in Figure 3. If the handle shaft 42 is removed from the socket 44 and inserted in the socket 52, the machine may be readily operated with the plate 10 in a vertical plane, the machine being rolled along on the roller 54. As the machine advances, the feeler 18 scoops up the grass that often overlies the adjacent margin of the pavement and lifts it into the operating path of the blade 34.

I claim:
A machine of the class described comprising a frame consisting of a generally circular plate which is normally horizontal, said plate having along its forward edge a series of deep rearwardly extending slots forming a series of forwardly projecting teeth, said plate also having a rearward extension, a skirt projecting down from the side edges of said plate and rearward extension, said skirt extending tangentially forward from one side of the circular plate, a motor shaft extending through the center of said plate, a motor carried by said plate and connected to the upper end of said shaft, a rotary blade secured at its mid point to the lower end of said shaft at a level above the bottom edge of said skirt, a pair of wheels journalled on said skirt at said rearward extension of the plate to turn about a horizontal axis, a pair of ears projecting horizontally from said skirt on the same side of the plate as said tangential extension of the skirt, a roller mounted between said ears to rotate about a vertical axis, said roller projecting outward slightly beyond said tangential extension, and an elongated handle member extending upward and rearward from said plate.

References Cited in the file of this patent
UNITED STATES PATENTS

| | | |
|---|---|---|
| 1,715,675 | Rader | June 4, 1929 |
| 2,612,741 | McKay | Oct. 7, 1952 |
| 2,653,381 | Rooke | Sept. 29, 1953 |
| 2,672,002 | Nelson | Mar. 16, 1954 |
| 2,708,335 | Newton | May 17, 1955 |
| 2,867,960 | Stiles et al. | Jan. 13, 1959 |